US00RE47822E

(19) United States
(12) Reissued Patent
Menard et al.

(10) Patent Number: US RE47,822 E
(45) Date of Reissued Patent: Jan. 21, 2020

(54) METHOD AND SYSTEM FOR REDUCING VIBRATION OF MOTION-ENABLED CHAIRS

(71) Applicant: D-BOX TECHNOLOGIES INC., Longueuil (CA)

(72) Inventors: Jean-Francois Menard, Boucherville (CA); Sylvain Trottier, St-Lambert (CA)

(73) Assignee: D-BOX TECHNOLOGIES INC., Longueuil (CA)

(21) Appl. No.: 15/647,654

(22) Filed: Jul. 12, 2017

Related U.S. Patent Documents

Reissue of:
(64) Patent No.: 9,089,786
Issued: Jul. 28, 2015
Appl. No.: 13/031,779
Filed: Feb. 22, 2011

(51) Int. Cl.
*G05B 21/00* (2006.01)
*A63J 25/00* (2009.01)

(52) U.S. Cl.
CPC ..... *A63J 25/00* (2013.01)

(58) Field of Classification Search
CPC ..... G01C 19/5762; G06T 7/20; A63G 31/16; B25J 9/1641
USPC ..... 73/504.04; 318/568.22; 375/240.03; 434/55
See application file for complete search history.

(56) References Cited

U.S. PATENT DOCUMENTS 3,923,300 A 12/1975 Tanus
5,015,933 A 5/1991 Watkins et al.
5,528,094 A 6/1996 Hasebe
5,629,986 A 5/1997 Shoureshi
5,651,072 A 7/1997 Nakao et al.
6,336,811 B2 * 1/2002 Shiina ..... A63G 31/16 434/55
6,507,165 B2 * 1/2003 Kato ..... B25J 9/1641 318/568.22

(Continued)

FOREIGN PATENT DOCUMENTS

JP 59065636 4/1984
JP 2309899 12/1990

(Continued)

OTHER PUBLICATIONS

International Search Report of PCT/CA2012/000156.
Written Opinion of PCT/CA2012/000156.

*Primary Examiner* — Christopher E. Lee
(74) *Attorney, Agent, or Firm* — Norton Rose Fulbright Canada LLP

(57) ABSTRACT

In a building equipped with a plurality of motion-enabled chairs such as a movie theatre, the vibration of the motion-enabled chairs adds up and may damage the foundation of the building especially at the resonance frequency. The present application describes a system and method for controlling the resulting vibration by introducing an alteration such as a delay or an inversion in the motion signals sent to the motion-enabled chairs. This delay causes the vibration of some motion-enabled chairs to be de-phased from the vibration of the other motion-enabled chairs. Whereby, the intensity (magnitude) of the resulting vibration is reduced. Control of the motion-enabled chairs may be done centrally through a central controller, or locally at selected motion-enabled chairs.

12 Claims, 10 Drawing Sheets

(56) References Cited

U.S. PATENT DOCUMENTS

| | | | | |
|---|---|---|---|---|
| 7,382,830 | B2 * | 6/2008 | Kondo | G06T 7/20 375/240.03 |
| 8,640,540 | B2 * | 2/2014 | Oshio | G01C 19/5762 73/504.04 |
| 2005/0157795 | A1 * | 7/2005 | Kondo et al. | 375/240.16 |
| 2008/0009776 | A1 * | 1/2008 | Trandafir | 601/53 |
| 2009/0206642 | A1 * | 8/2009 | Raphael et al. | 297/217.3 |
| 2010/0127442 | A1 * | 5/2010 | Muragishi et al. | 267/140.14 |
| 2010/0205867 | A1 * | 8/2010 | Park | 52/8 |
| 2010/0320819 | A1 * | 12/2010 | Cohen et al. | 297/217.4 |
| 2011/0040161 | A1 * | 2/2011 | Abreu | 600/321 |
| 2013/0005442 | A1 * | 1/2013 | Erickson et al. | 463/25 |

FOREIGN PATENT DOCUMENTS

| | | |
|---|---|---|
| KR | 1020050068674 | 7/2005 |
| WO | WO 201116244 A | 12/2011 |

* cited by examiner

METHOD AND SYSTEM FOR REDUCING VIBRATION OF MOTION-ENABLED CHAIRS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is the first disclosure of this invention.

BACKGROUND (a) Field

The subject matter disclosed generally relates to the field of motion-enabled chairs.

(b) Related Prior Art

Motion-enabled chairs are becoming more and more popular in theatres. An example of such motion-enabled chairs is described in co-owned U.S. Patent Publication No. 20100090507 entitled Motion-Enabled Movie theatre Seat, which is incorporated herein by reference in its entirety.

Generally, motion-enabled chairs include one or more actuators connected to the base of the seat to produce vibrations and movements which are synchronized with and corresponding to the events displayed on the screen. The motion-enabled chairs are usually installed in a building and controlled by a central controller to induce and synchronize the vibrations/movements with the events displayed on the screen. A broad definition of motion-enabled chairs also includes tactile transducers and inertial shakers. This description therefore applies to such devices.

While advantageous and fun to use, when two or more motion-enabled chairs are provided on a certain platform, the vibration of these motion-enabled chairs add up and may damage the foundation of the building especially at the resonance frequency.

In particular, since all the motion-enabled chairs are synchronized with each other, when a certain event occurs on the screen which triggers the production of vibrations in the motion-enabled chairs, e.g. a car driving on an unpaved road, etc., all the motion-enabled chairs would vibrate in the same manner so that the users obtain the same feeling. Depending on the number of motion-enabled chairs and the floor on which the motion-enabled chairs are installed, the resulting vibration may damage the foundation or transfer the vibrations to other floors.

Therefore, there is a need for a system and method for controlling the movements of motion-enabled chairs to reduce the resulting vibration, without affecting the user's enjoyment and/or experience.

SUMMARY

According to an embodiment, there is provided a method for controlling an intensity of a vibration resulting from a set of motion-enabled chairs receiving motion signals that are synchronized. The method comprising: selecting, from the set, one or more motion-enabled chairs to control; and altering motion signals for the selected motion-enabled chairs to de-phase the vibration of the selected motion-enabled chairs from the vibration of non-selected motion-enabled chairs, thereby reducing the intensity of the vibration resulting from the set of motion-enabled chairs.

According to another embodiment, there is provided a central transmitter for controlling an intensity of a vibration resulting from a set of motion-enabled chairs receiving motion signals that are synchronized. The central transmitter comprising:

- a processing module for altering the phase of motion signals sent to selected motion-enabled chairs from the set; and
- an output module for sending the altered motion signals to selected motion-enabled chairs, and non-altered motion signals to non-selected motion-enabled chairs, thereby reducing the intensity of the vibration resulting from the set of motion-enabled chairs.

According to another embodiment, there is provided a set of motion-enabled chairs attached to a structure and configured for reducing, in the structure, an intensity of a vibration resulting from movement of the set of motion-enabled chairs receiving motion signals. The set of motion-enabled chairs comprising:

- a first group of motion-enabled chairs; and
- a second group of motion-enabled chairs;
- the first group of motion-enabled chairs producing altered vibrations de-phased, in a given frequency range, with respect to the vibrations produced by the second group of motion-enabled chairs, thereby reducing the intensity of the vibration resulting from movement of the set of motion-enabled chairs.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

In a building equipped with a plurality of motion-enabled chairs such as a movie theatre, the vibrations of the motion-enabled chairs add up and may damage the foundation of the building especially at the resonance frequency. The present application describes a system and method for controlling the resulting vibration by introducing an alteration such as a delay or an inversion in the motion signals sent to the motion-enabled chairs. This delay causes the vibration of some motion-enabled chairs to be de-phased from the vibration of the other motion-enabled chairs. Whereby, the intensity (magnitude) of the resulting vibration is reduced. Control of the motion-enabled chairs may be performed centrally through a central controller, or locally at selected motion-enabled chairs.

Figure 1:
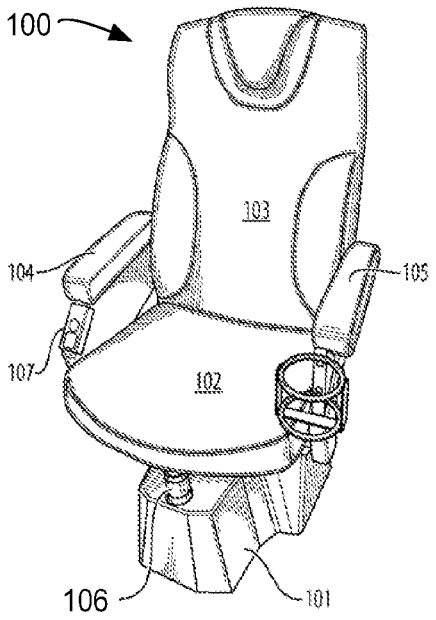
FIG. 1 is a perspective view illustrating an example of a motion-enabled chair that may be controlled by the present embodiments.

FIG. 1 illustrates an example of a motion-enabled chair 100 as shown in co-owned U.S. Patent Publication No. 20100090507. In the example shown in FIG. 1, the base (not shown) of the motion-enabled chair 100 is covered by a protective cover 101. The seating portion of the motion-enabled chair 100 is very similar to a standard movie chair or seat and comprises a seat base 102, a backrest 103 and armrests 104-105. Between the protective cover 101 and the seat base 102 there may be a protection skirt (not shown) for preventing users from injury while viewing a movie comprising motion effects. The protection skirt is horizontally wrinkled and made of flexible material to adjust itself during the actuating (movement of the motion-enabled chair).

The motion-enabled chair includes one or more actuators 106 connected to the seat base 102, and a controller (not shown) to receive motion signal from a central transmitter 300 and interpret and transform the motion signal into drive signals for driving each actuator 106. The central transmitter 300 receives or generates the motion signal in accordance with the video and or audio signals of a feature length movie. In an embodiment, motion-enabled chair 100 comprises three actuators 106, two of which are not shown in FIG. 1.

Below the right armrest 104, a control panel 107 is accessible to the user for controlling the intensity (e.g., the amplitude range of the actuators 106) of the motion effect inducing in the motion-enabled chair 100. Some of the options (i.e., modes of operation) include "Off" (i.e., no motion), "Light" (i.e., reduced motion), "Normal" (i.e., regular motion), "Heavy" (i.e., maximum motion), "Discreet" (i.e., fully controllable motion level between "Off" and "Heavy"), and "Automatic". In the "Automatic" mode, the motion-enabled chair 100 uses a sensor (not shown) to detect a characteristic of the user (e.g., weight, height, etc.) and, based on the characteristic, determines the setting for the level of motion that will be induced in the motion-enabled chair 100.

The present embodiments aim at reducing the vibration resulting from a plurality of motion-enabled chairs 100 without effecting any hardware change to the motion-enabled chairs 100. It is also an object to reduce the resulting vibration of the motion-enabled chairs 100 in a manner that is unnoticeable by the user. Therefore, it is important to maintain the user's experience and enjoyment on the motion-enabled chair they occupy while at the same time not letting them notice any delay or difference in the movement between the motion-enabled chair they occupy and a neighboring motion-enabled chair. Therefore, at low frequencies all the motion-enabled chairs may move in the same manner especially such that the resulting vibration is negligible and causes no harm. The delay or inversion may be introduced, where appropriate/needed at higher frequencies where the user cannot detect the difference in motion between the motion-enabled chair they are on and the neighboring motion-enabled chair. For example, it is possible that a delay introduced between the motion signals of neighboring motion-enabled chairs causes the motion signals to be the inverse of each other at a given frequency. In which case, the movement of one motion-enabled chair may be the opposite of the other e.g. one motion-enabled chair moving up and the other one moving down. However, because the vibrations occur at high frequencies, the user cannot notice the difference, and thus, the user's experience is not affected by the delay introduced.

Central Control

Figure 2:
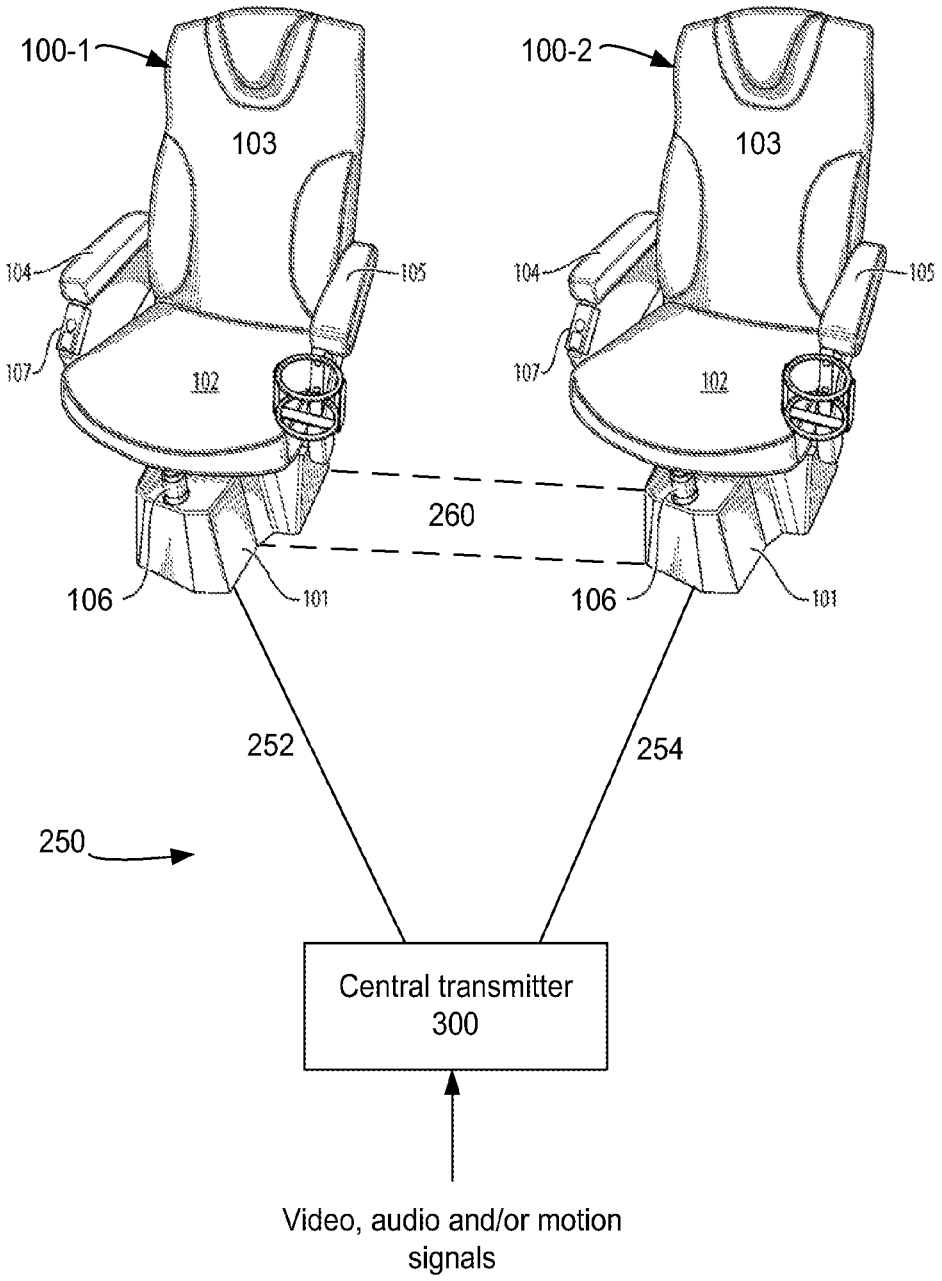
FIG. 2 is a schematic diagram illustrating a system for controlling the motion signals of two motion-enabled chairs in accordance with an embodiment.

In one aspect, movement of the different motion-enabled chairs is controlled centrally in the central transmitter 300 which generates de-phased motion signals and sends these signals to selected motion-enabled chairs or groups of motion-enabled chairs for controlling the resulting vibration of the motion-enabled chairs. FIG. 2 illustrates an embodiment of a system 250 for controlling the motion of two or more motion-enabled chairs centrally.

The system 250 comprises two (or more) motion-enabled chairs 100-1 and 100-2 (hereinafter motion-enabled chairs 100). The motion-enabled chairs 100 are mounted on a platform 260. The platform 260 may be the ground (e.g., concrete) or an actual board made of metal, plastic, wood or any other suitable material provided between the motion-enabled chairs and the ground. The controller of each of the motion-enabled chairs receives a motion signal from the central transmitter 300 to interpret and transform the motion signal into drive signals for driving each of the actuators 106 of the motion-enabled chair.

In order to reduce the resulting vibration of the motion-enabled chairs 100 on the platform 260, the central transmitter 300 introduces a delay between the motion signal of one motion-enabled chair and the motion signal of the other motion-enabled chair to de-phase the motion signals, whereby the resulting vibration (aka total vibration or sum of the vibrations) of the two motion-enabled chairs is reduced.

In an embodiment, the central transmitter computes a delay that cancels the total vibration at a certain frequency, e.g. the resonance frequency, and reduces the total vibration at the neighboring frequencies. In an embodiment, the delay T introduced is calculated in accordance with the following equation 1 in which F is the frequency at which the total vibration needs to be cancelled:

$$T=1/(2F) \qquad \text{Equation 1:}$$

The resonance frequency may vary between a building and the other depending on the number of floors, construction materials, etc. In an embodiment, the resonance frequency ranges between 10 Hz and 50 Hz. However, it is to be noted that the present embodiments are not limited to a certain frequency range.

In another embodiment, for a given frequency range (e.g., 10 Hz to 100 Hz), the motion signal input to one motion-enabled chair is the inverse of the motion signal input to the other motion-enabled chair, whereby the vibrations of one motion-enabled chair may be substantially cancelled by the other motion-enabled chair, and the resulting vibration transmitted to the ground is substantially eliminated.

Transmission of de-phased motion signals to the motion-enabled chairs 100 may be done in several ways.

In the embodiment shown in FIG. 2, each motion-enabled chair 100 receives a dedicated motion signal directly from the central transmitter 300. For example, motion-enabled chair 100-1 receives its motion signal on link 252, and motion-enabled chair 100-2 receives its motion signals using link 254. Motion signals sent via links 252 and 254 are de-phased with respect to each other in order to reduce the total vibration of the two motion-enabled chairs, as described above.

According to an embodiment, the central transmitter 300 includes a sensor (not shown) for detecting and for selecting a frequency at which the vibration is to be reduced. The sensor can be in the central transmitter 300 cut it could also be located outside of the central transmitter 300. In an embodiment, the detected and selected frequency varies over time. The altering of the motion signal is therefore adjusted accordingly. In an embodiment, the sensor is for detecting an amplitude of a vibration at multiple frequencies. The sensor is further for selecting a frequency at which the vibration is to be reduced based on the amplitude of the vibration at a frequency from the multiple frequencies. The selected frequency can therefore be the one at which the amplitude of the vibration is the greatest, the one which produces the highest level of noise, or the one which would cause the greatest damage to the structure.

Figure 3A:
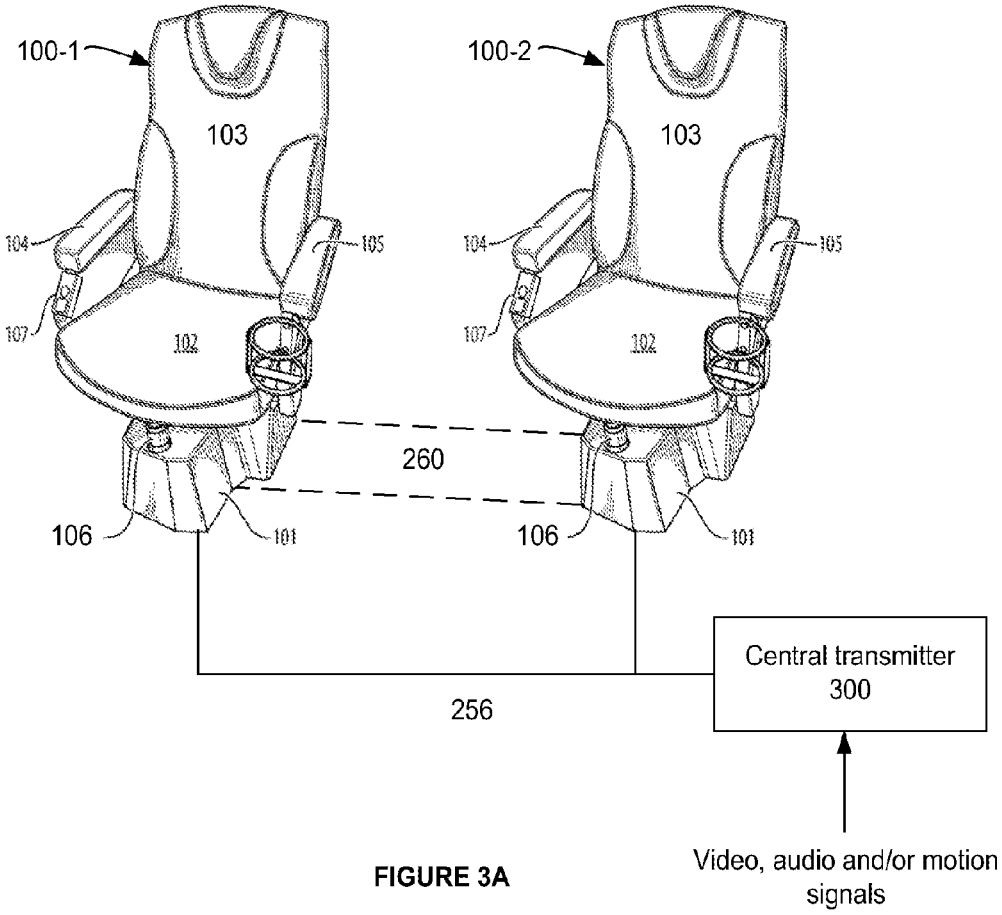
FIGS. 3A and 3B are schematic diagrams illustrating different embodiments of a system for transmitting de-phased motion signals for controlling the motion of two motion-enabled chairs.
Figure 3B:
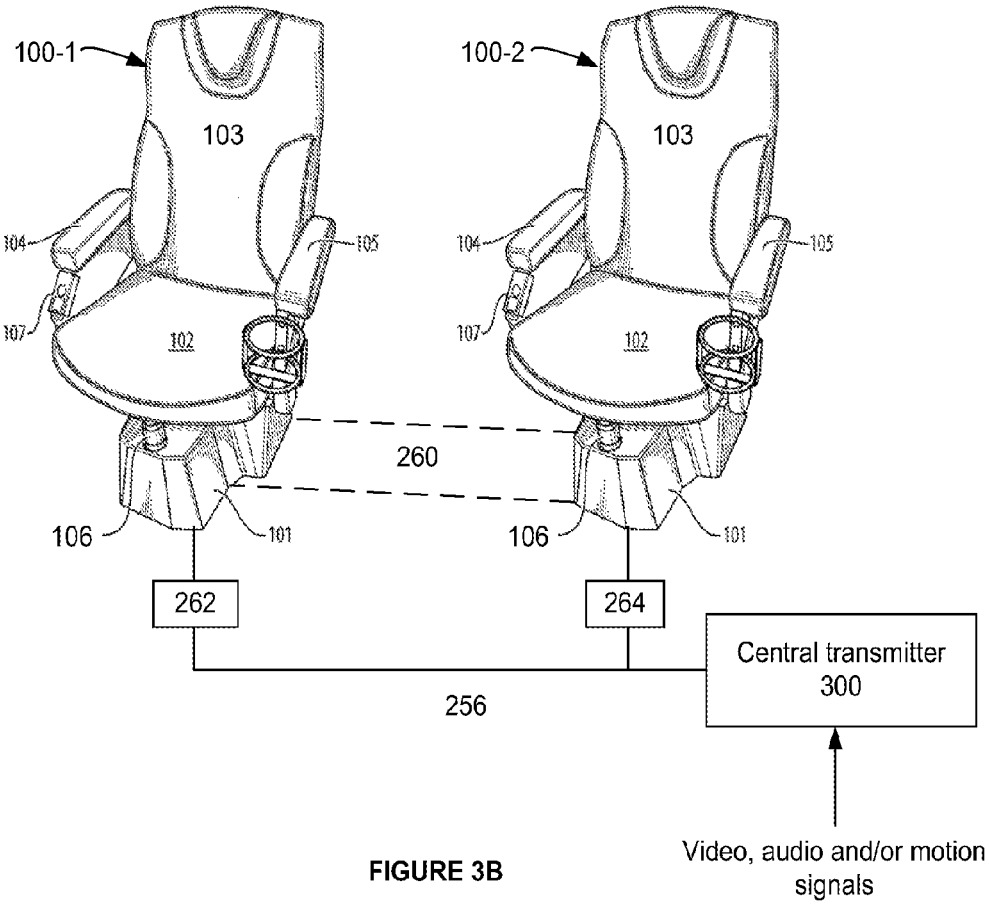

FIGS. 3A and 3B illustrate another embodiment, in which, de-phased motion signals dedicated to more than one motion-enabled chair are multiplexed and sent on the same link 256, e.g. as a demultiplexed/encoded signal to be demultiplexed/decoded at each motion-enabled chair in order for each motion-enabled chair to receive the corresponding motion signal designated to it by the central transmitter 300.

In the embodiments shown in FIGS. 3A & 3B, the central transmitter 300 de-phases the motion signals, encodes them, and sends the encoded de-phased motion signals simultaneously on the link 256 as a multiplexed signal. Each motion-enabled chair receives the modulated signal sent by the central transmitter 300 and demultiplexes the received signal to extract the corresponding motion signal dedicated to it. In one example of implementation, it is possible to assign a signal ID to each motion-enabled chair and use the signal ID in decoding the multiplexed signal using well-known techniques.

Demultiplexing of the multiplexed signal received on the link 256 may be done within the controller of each motion-enabled chair using a software program or using only a software modification as in the embodiment shown in FIG. 3A, or by means of an external device (aka external processor) connected between the link 256 and the controller of the motion-enabled chair such as devices 262 and 264 shown in FIG. 3B.

Figure 4:
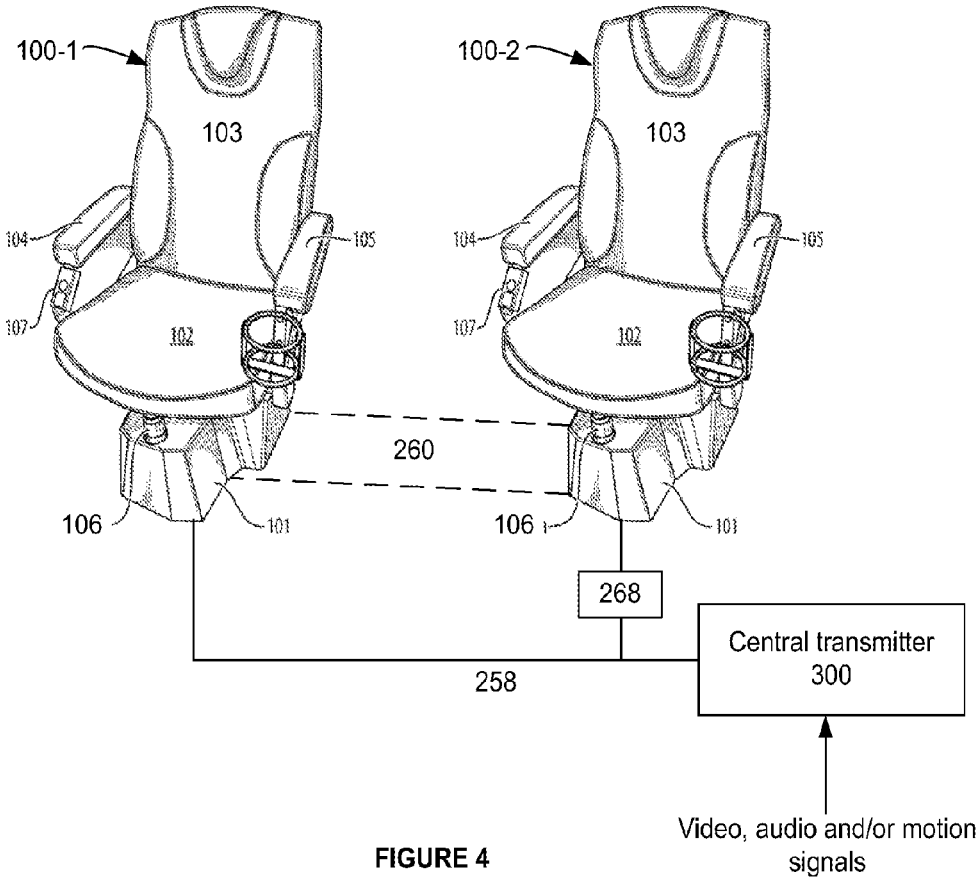
FIG. 4 is a schematic diagram illustrating a system for controlling the motion of two motion-enabled chairs, in accordance with a further embodiment.

Another example of implementation is shown in FIG. 4. In the example of FIG. 4, the central transmitter 300 encodes a first and second de-phased motion signals on link 258 in a manner that regular motion-enabled chairs (100-1) will detect the first motion signal and discard the second, and motion-enabled chairs which are connected to an external decoder 268 or motion-enabled chairs (100-2) which are equipped with an internal decoding program will detect the second motion signal and discard the first. This scenario allows for the reduction of the number of motion-enabled chairs to upgrade (software/hardware).

Figure 5:
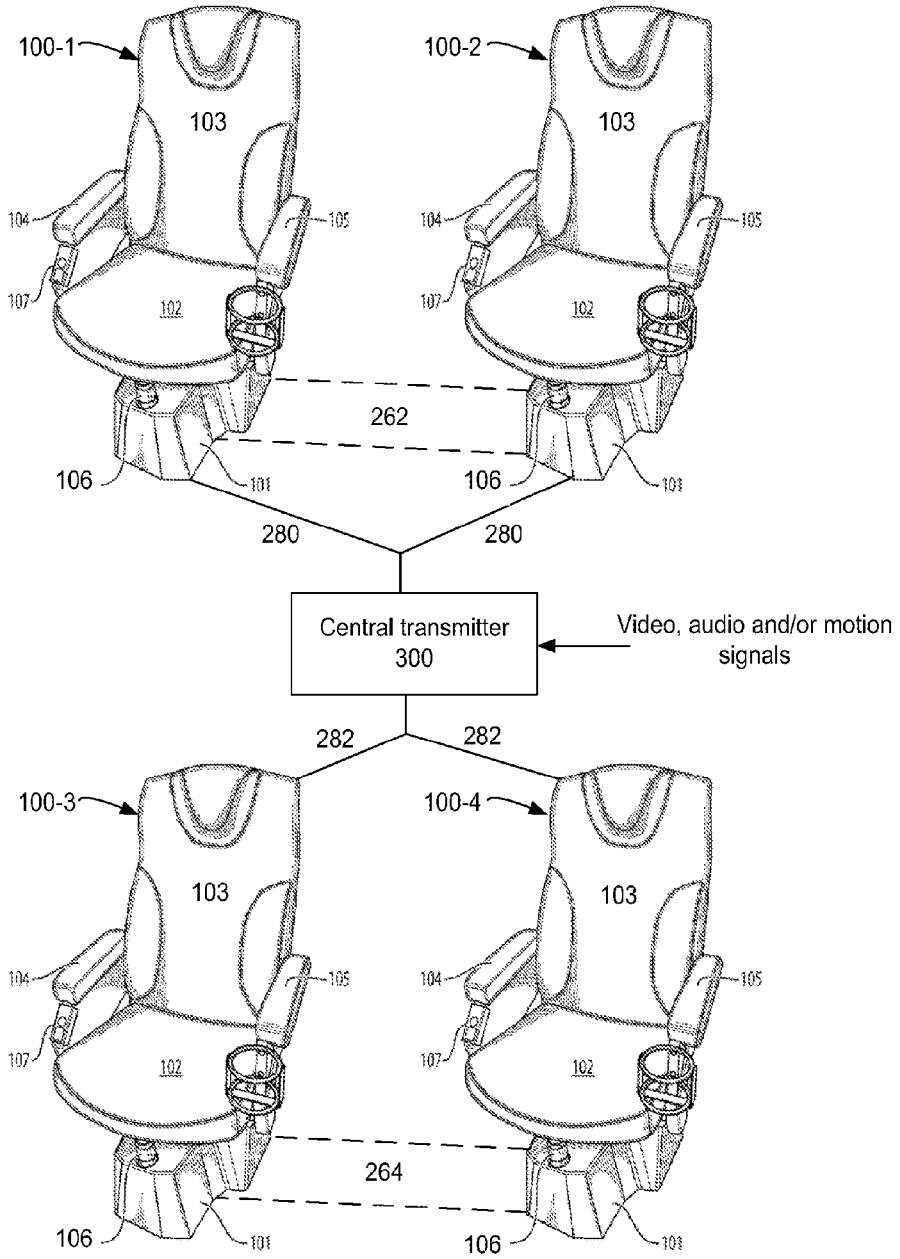
FIG. 5 is a schematic diagram illustrating an embodiment, in which, the motion signal for the motion-enabled chairs mounted on one platform is de-phased with regard to the motion signals mounted on the other platform.

FIG. 5 illustrates a further embodiment, in which the motion signal for the motion-enabled chairs mounted on one platform is de-phased with regard to the motion signals for the motion-enabled chairs mounted on the other platform. As shown in FIG. 5, motion-enabled chairs 100-1 and 100-2 are mounted on a platform 262, while motion-enabled chairs 100-3 and 100-4 are mounted on a platform 264. In the embodiment shown in FIG. 5, the motion-enabled chairs on the platform 262 receive a motion signal 280 while the motion-enabled chairs on the platform 264 receive a motion signal 282 which is de-phased from the motion signal 280. This way the vibration of the motion-enabled chairs on one platform can cancel the vibration of the motion-enabled chairs on other platforms, and the resulting vibration transmitted to the ground is cancelled/reduced. Transmission of the motion signals from the central transmitter 300 to the motion-enabled chairs 100 may be done using the embodiments described in any one of FIGS. 2 to 5, or in accordance with other techniques which are well known in the art.

Figure 7:
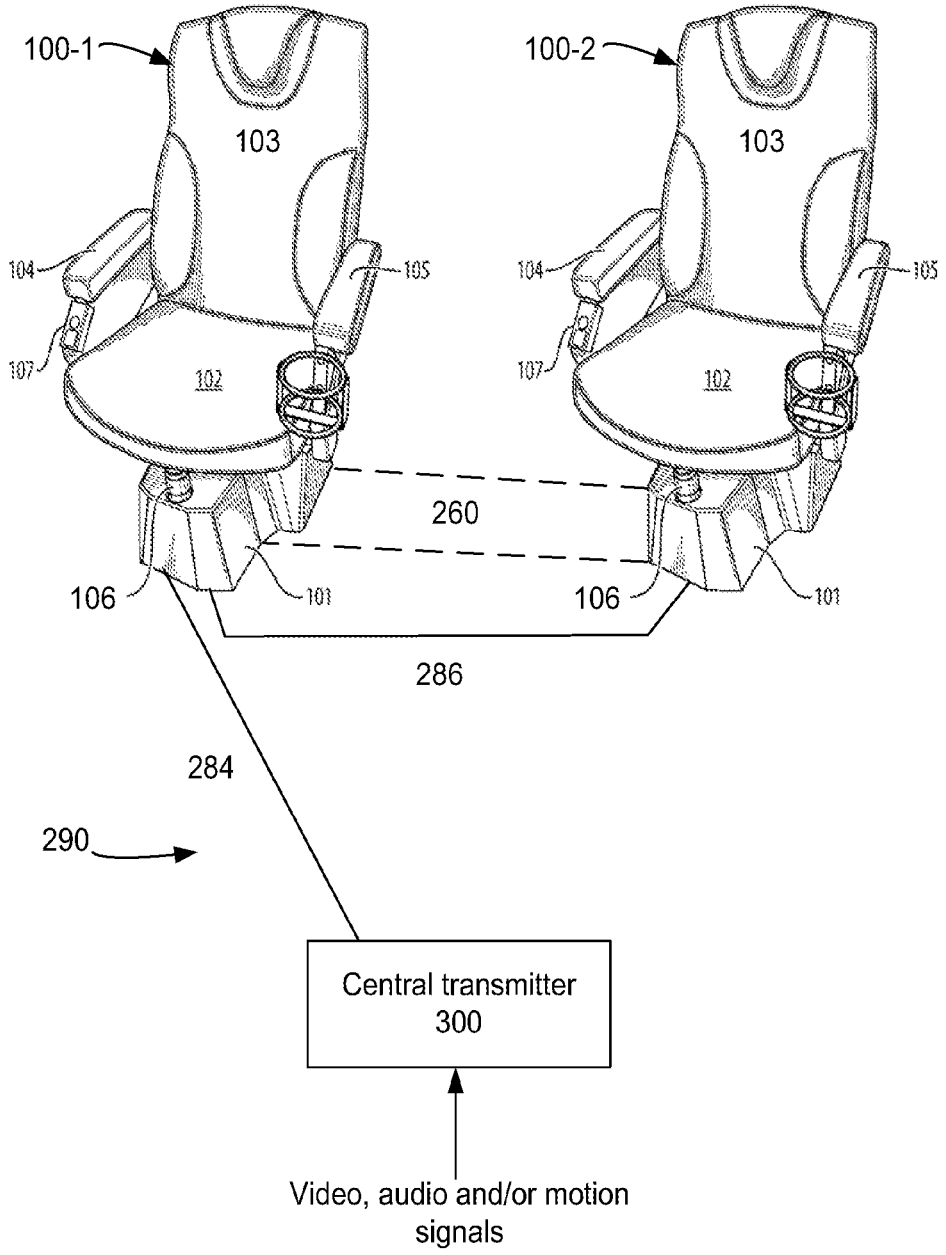
FIG. 7 is a schematic diagram illustrating a system for controlling the motion of two motion-enabled chairs, in accordance with a further embodiment.

FIG. 7 illustrates an embodiment of a system 290 for controlling the motion of two or more motion-enabled chairs centrally. The system 290 comprises two (or more) motion-enabled chairs 100-1 and 100-2. The motion-enabled chairs 100-1 and 100-2 are mounted on a platform 260. Each motion-enabled chair receives motion signals to interpret and to transform into drive signals for driving each of the actuators 106 of the motion-enabled chair.

The motion signal is "daisy-chained" from one motion-enabled chair to the other. That is, the motion signals for all motion-enabled chairs are encoded by central transmitter 300 and sent on the same link 284 to motion-enabled chair 100-1. Motion-enabled chair 100-1 picks up its own motion signal while the same signal send on link 284 is repeated/transmitted on link 286 to motion-enabled chair 100-2. Motion-enabled chair 100-2 will pick up its own signal which is delayed relative to the signal for motion-enabled chair 100-1.

In an embodiment of the central control aspect, selection of the motion-enabled chairs is done on the basis of the weight of the occupants. As explained above, the motion-enabled chairs may be equipped with weight sensors to detect the weight of the user and report this information to the central transmitter 300. The central transmitter 300 receives the information from the plurality of motion-enabled chairs, and processes this information centrally to divide the motion-enabled chairs in groups where all the motion-enabled chairs in one group receive the same motion signal, wherein the motion signal sent to one group is de-phased from the motion signal sent to the other group. This will be exemplified in the non-limiting example shown in FIG. 6.

Figure 6:
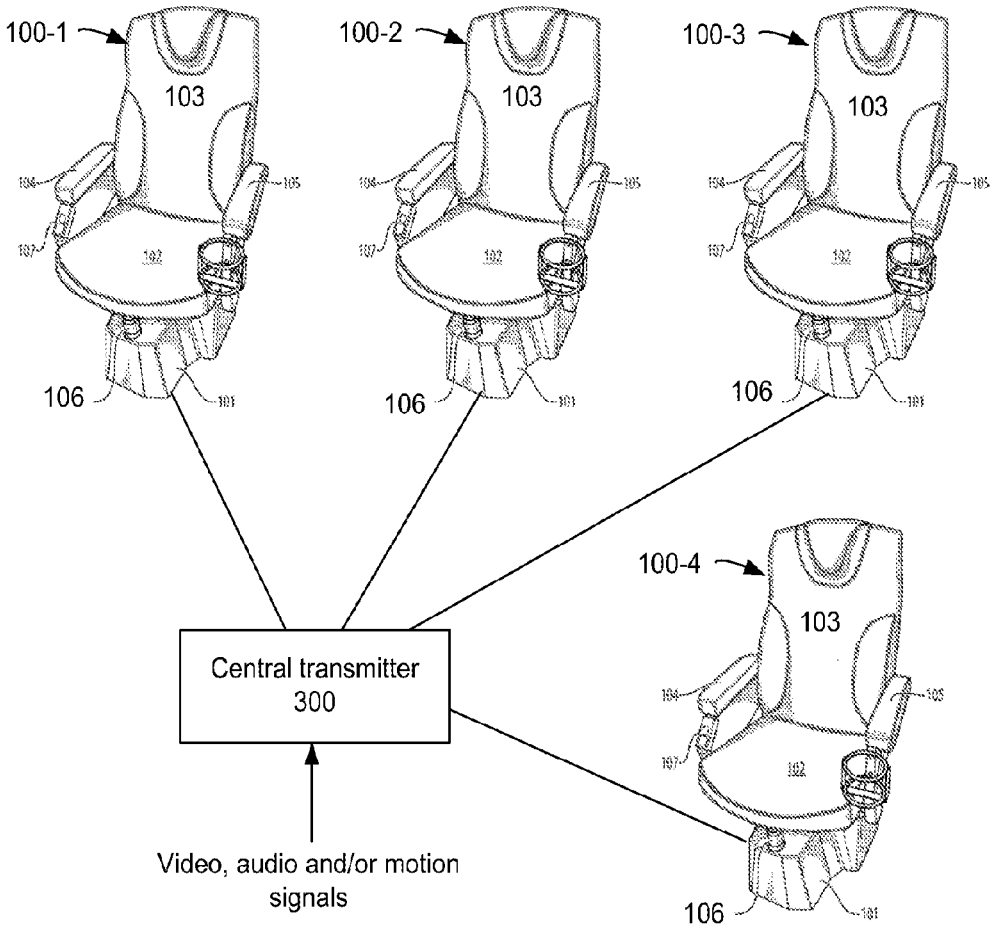
FIG. 6 is a schematic diagram illustrating an embodiment, in which, selection of the motion-enabled chairs is done on the basis of the weight of the occupants.

With reference to FIG. 6, consider a scenario where the weight of the occupants of the motion-enabled chairs 100-1 to 100-4 is as follows:

100-1: 100 pounds;
100-2: 160 pounds;
100-3: 145 pounds;
100-4: 210 pounds;

When the weight of each use is used by the central processor, it processes the information to divide the motion-enabled chairs into groups on the basis of the weigh and/or also the proximity of the motion-enabled chairs to each other in order to optimize the vibration cancellation process. In the present example, the occupants of motion-enabled chairs 100-1 and 100-4 weigh 310 pounds, and the occupants of motion-enabled chairs 100-2 and 100-3 together weigh 305 pounds. Therefore, the central transmitter 300 may group motion-enabled chairs 100-1 and 100-4 in one group and motion-enabled chairs 100-2 and 100-3 in another group, and provide the two groups with motion signals which are de-phased from each other.

Local Control

In another aspect, control of the movements and introduction of the delay is done locally at the motion-enabled chairs without changing the manner in which the central controller functions.

For example, it is possible that the controller of selected motion-enabled chairs introduces a delay to the motion signal received from the transmitter. The controller may be programmed to introduce the delay when detecting a predetermined frequency. Alternatively, an external decoder may introduce the delay when detecting the pre-determined frequency. For example, the external decoder 268 of FIG. 4 may be implemented to introduce the delay in the motion signal received at motion-enabled chair 100-2, whereby the total vibration of motion-enabled chairs 100-1 and 100-2 may cancel each other.

Figure 8:
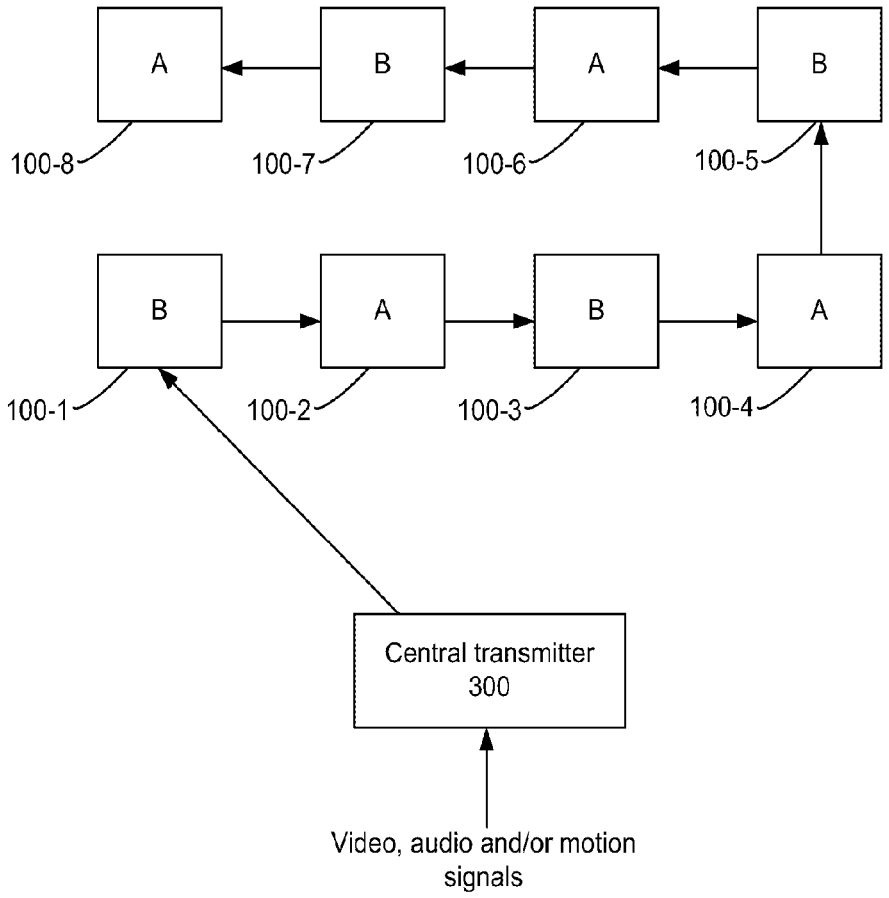
FIG. 8 is a schematic diagram illustrating an arrangement of motion-enabled chairs which are divided in two groups for receiving differently delayed motion signals according to an embodiment of the invention.

FIG. 8 shows how motion-enabled chairs divided into groups of alternating neighboring motion-enabled chairs such that each motion-enabled chair will receive motion signals which are delayed as compared with motion signals received by its immediate neighbor.

As discussed above, a central transmitter 300 prepares the motion signals and forwards them to the motion-enabled chairs 100. In this embodiment, the motion signals are first sent to motion-enabled chair 100-1, then to motion-enabled chair 100-2, and so on until it reaches the last motion-enabled chair 100-8. Each motion-enabled chair 100 picks up the motion signals which are destined to it.

In the embodiment shown in FIG. 8, the motion-enabled chairs are divided into group A and group B (i.e., alternating neighboring motion-enabled chairs). The group A motion-enabled chairs receive motion signals which are inverted in a given frequency range relative to group B motion-enabled chairs. The result is that each motion-enabled chair 100 will produce vibrations in the given frequency range which are inverted as compared with motion signals produced by its immediate neighbor.

In another embodiment shown in FIG. 8, the motion-enabled chairs are also divided into group A and group B (i.e., alternating neighboring motion-enabled chairs). Both groups of motion-enabled chairs receive the motion signals. Group A motion-enabled chairs apply locally a delay which is different from a delay applied locally by the group B motion-enabled chairs. The result is that each motion-enabled chair 100 will generate motion which is delayed as compared with motion generated by its immediate neighbor.

Figure 9:
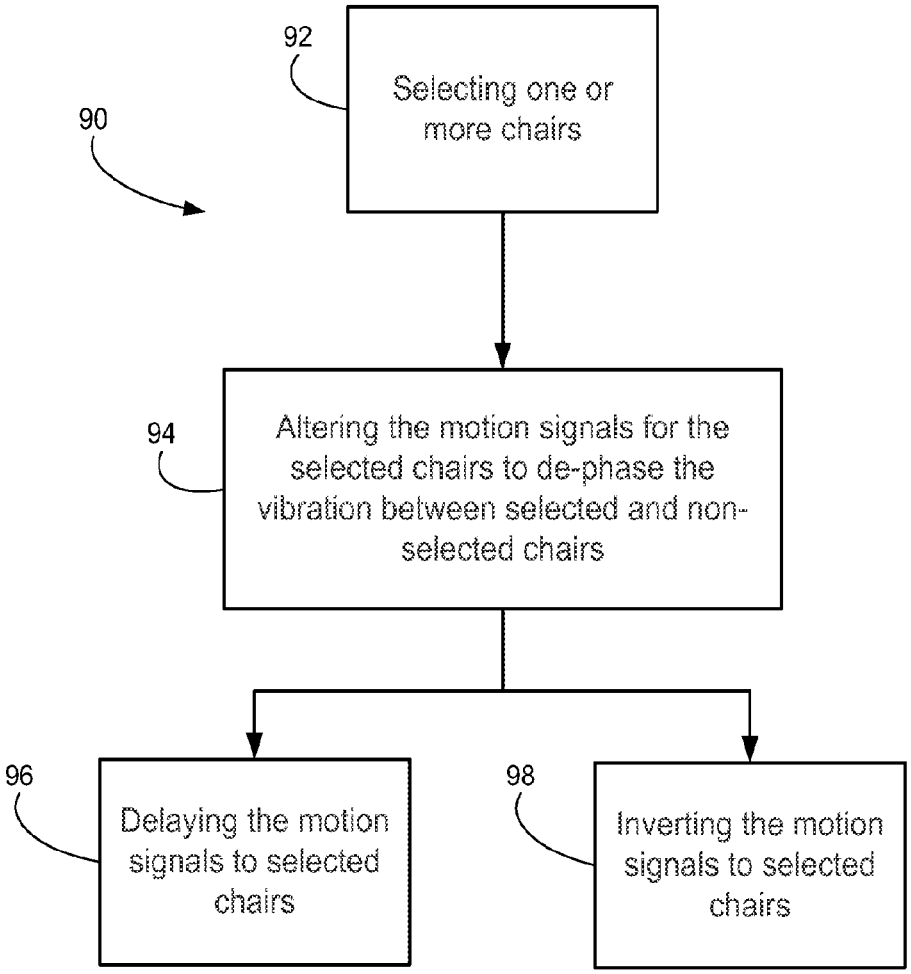
FIG. 9 is a schematic diagram illustrating a method for controlling a vibration intensity resulting from a multitude of motion-enabled chairs.

Now turning to FIG. 9, there is shown a method 90 for controlling a vibration intensity resulting from a multitude of motion-enabled chairs receiving synchronized motion signals. The method 90 comprises: selecting one or more motion-enabled chairs to control (step 92); and altering the motion signals for the selected motion-enabled chairs to de-phase the vibration of the selected motion-enabled chairs from the vibration of the non-selected motion-enabled chairs (step 94), thereby reducing the vibration intensity resulting from all the motion-enabled chairs.

According to an embodiment, the altering of the motion signals comprises at least one of delaying the motion signals for all frequencies or a in given frequency range to the selected motion-enabled chairs (step 96) and inverting the motion signals in a given frequency range to the selected motion-enabled chairs (step 98).

Variations

While the drawings provided in this application illustrate only two motion-enabled chairs on each platform, it is to be noted that the design is not limited to only two motion-enabled chairs. Any number of motion-enabled chairs may be controlled as described in the present embodiments without departing from the scope of this disclosure.

According to another embodiment, it is to be noted that the design is also applicable to more than two platforms.

Furthermore, the term neighboring motion-enabled chair does not necessarily mean that the motion-enabled chairs have to be right beside each other. As discussed above, the motion-enabled chairs are generally equipped with a weight sensor. Therefore, when a motion-enabled chair is vacant the vibrations and/or movements would be disabled. Therefore, in the case where a vacant motion-enabled chair exists between two occupied motion-enabled chairs, the neighboring motion-enabled chairs could be the motion-enabled chairs that are occupied and not the vacant motion-enabled chairs.

It is also to be noted that the links on which the motion signals are sent may be selected from a wide variety of options available on the market. For example, the link may be a wired link such as a coaxial cable, fiber optic cable, CAT 5 cable, etc. or may be a wireless link including a transmitter at the central transmitter 300 and a receiver at some or all of the motion-enabled chairs.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

According to another embodiment, an instruction signal (e.g., instructions, metadata information) which accompanies the motion signals gives instructions to the chairs (i.e., on selected chairs or all chairs depending on the instruction signal). The instruction signal may include instructions for 1—reducing the volume to be played in advance of the motion signal to avoid locally processing the instruction signal thereby avoiding unnecessary processing delays; 2—cutting out the selected frequency (or given frequency range); or 3—mixing high frequencies and low frequencies.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A method for controlling an intensity of a vibration resulting from an addition of the vibrations caused by a set of motion-enabled chairs receiving motion signals that are synchronized, the motion-enabled chairs of the type being motion enabled by actuators between the ground and a seating portion, the method comprising:

selecting, from the set, one or more motion-enabled chairs to control, with a pair of immediate neighbor motion-enabled chairs comprising one said selected motion-enabled chair and one non-selected motion enabled chair;

[altering] *de-phasing* motion signals for the selected motion-enabled chairs *relative to the motion signals of the non-selected motion-enabled chairs* to de-phase the vibration of the selected motion-enabled chairs from the vibration of the non-selected motion-enabled chairs;

sending [altered] *de-phased* motion signals to the selected motion-enabled chairs[; and sending non-altered motion signals] *relative to motion signals concurrently sent* to the non-selected motion-enabled chairs, thereby reducing the intensity of the vibration resulting from the addition of the vibrations caused by the set of motion-enabled chairs.

2. The method of claim 1, further comprising selecting a frequency at which the vibration is to be reduced.

3. The method of claim 2, wherein [the altering] *de-phasing motion signals* comprises applying a delay that allows *to motion signals sent to at least one of group of the selected motion-enabled chairs and of the non-selected motion-enabled chairs* for a substantial cancellation of the vibration at the selected frequency.

4. The method of claim 3, further comprising calculating the delay in accordance with the following equation in which T represents the delay and F represents the selected frequency: T=1/ (2F).

5. The method of claim 2, wherein the frequency is selected in a range between 10 Hz and 50 Hz.

6. The method of claim 2, wherein the frequency is selected to be the resonance frequency of a building in which the set of motion-enabled chairs is located.

7. The method of claim 1, wherein for a given frequency range, the motion signals to the selected motion-enabled chairs is the inverse of the motion signals to the non-selected motion-enabled chairs.

8. The method of claim 7, wherein the given frequency range is between 10 Hz and 100 Hz.

9. The method of claim 1, further comprising:

performing the [altering] *de-phasing* centrally, at a central transmitter; and sending motion signals to the set of motion-enabled chairs from the central transmitter.

10. The method of claim 1, wherein the selecting one or more motion-enabled chairs to control comprises dividing the set of motion-enabled chairs into groups of alternating neighboring motion-enabled chairs, wherein each motion-enabled chair will receive motion signals which are altered as compared with motion signals received by its immediate neighbor corresponding to an adjacent motion-enabled chair of the set of motion-enabled chairs.

11. The method of claim 1, wherein the selecting one or more motion-enabled chairs to control comprises:

receiving information relating to an occupant weight from each motion-enabled chair; and dividing the set of motion-enabled chairs in two groups, a first and a second group, based on the weight of each occupant wherein the sum of the weight each occupant in the first group is similar or substantially equal to the sum of the weight of each occupant in the second group.

*12. The method according to claim 1, wherein sending de-phased motion signals to the selected motion-enabled chairs includes sending non-altered motion signals to the non-selected motion-enabled chairs.*

* * * * *